United States Patent
Newkirk et al.

(10) Patent No.: US 8,617,661 B2
(45) Date of Patent: Dec. 31, 2013

(54) SYSTEMS AND METHODS FOR FABRICATING A DIRECT METAL DEPOSITION STRUCTURE HAVING FULLY FORGED STRUCTURAL QUALITIES

(75) Inventors: Joseph William Newkirk, Rolla, MO (US); Fuewen Frank Liou, Rolla, MO (US); Romy Francis, Bensalem, PA (US)

(73) Assignee: The Curators of the University of Missouri, Columbia, MO (US)

( * ) Notice: Subject to any disclaimer, the term of this patent is extended or adjusted under 35 U.S.C. 154(b) by 478 days.

(21) Appl. No.: 12/787,075

(22) Filed: May 25, 2010

(65) Prior Publication Data

US 2011/0293840 A1    Dec. 1, 2011

(51) Int. Cl.
*B05D 3/12* (2006.01)
(52) U.S. Cl.
USPC ............. 427/367; 118/100; 164/46; 427/357; 427/376.3; 427/376.4; 427/376.6; 427/383.7
(58) Field of Classification Search
USPC ................ 427/367, 357, 372.2, 376.4, 376.5, 427/376.7, 376.8, 383.1, 383.7; 700/119, 700/120; 118/100; 164/46
See application file for complete search history.

(56) References Cited

U.S. PATENT DOCUMENTS

| | | | |
|---|---|---|---|
| 5,641,358 A * | 6/1997 | Stewart | 118/715 |
| 6,391,251 B1 * | 5/2002 | Keicher et al. | 419/7 |
| 2005/0224209 A1 * | 10/2005 | Skszek et al. | 164/46 |
| 2007/0272724 A1 * | 11/2007 | Christopherson | 228/2.1 |
| 2008/0041921 A1 * | 2/2008 | Creehan et al. | 228/101 |

OTHER PUBLICATIONS

Yaxin Bao, Mechanical Properties and Microstructure Study for Direct Metal Deposition of Titanium Alloy and Tool Steel, 2007.

* cited by examiner

*Primary Examiner* — Alexander Weddle
(74) *Attorney, Agent, or Firm* — Polster, Lieder, Woodruff & Lucchesi, LC

(57) ABSTRACT

A method for fabricating a direct metal deposition (DMD) structure having substantially fully forged structural qualities is provided. In various embodiments, the method includes depositing a layer of metallic material onto an existing metallic structure having a microstructure that provides the existing metallic structure with substantially fully forged structural qualities. The DMD layer has a microstructure that provides the DMD layer with non-forged structural qualities. The method additionally includes applying a friction stir process to the deposited DMD layer utilizing a friction stir device such that the deposited DMD layer and at least a DMD affected zone of the existing metallic structure are friction stirred to refine and homogenize the microstructure of the deposited DMD layer and at least the DMD affected zone of the existing metallic structure, thereby producing a non-forged aggregate structure having a microstructure that provides the aggregate structure substantially fully forged structural qualities.

8 Claims, 10 Drawing Sheets

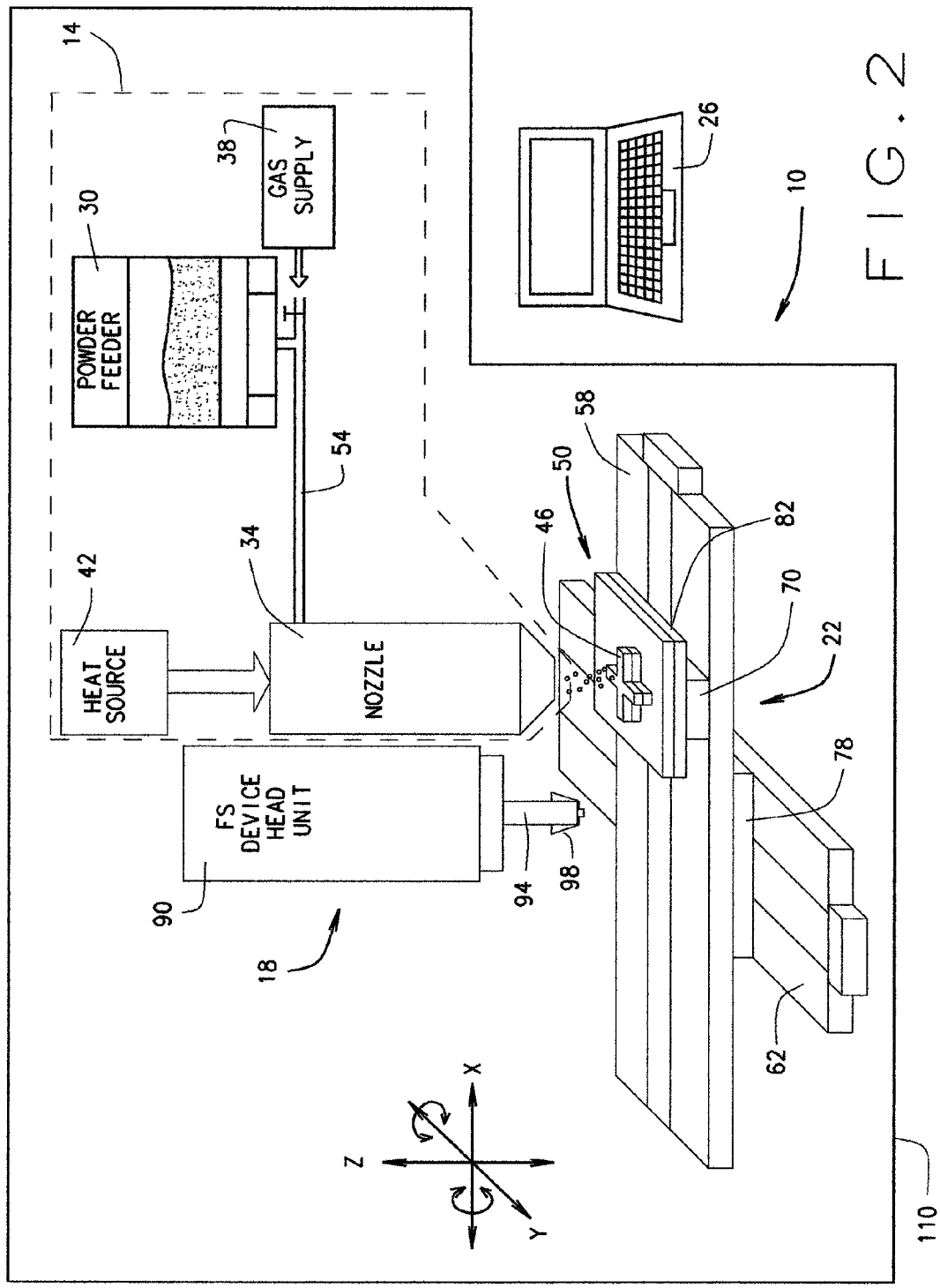

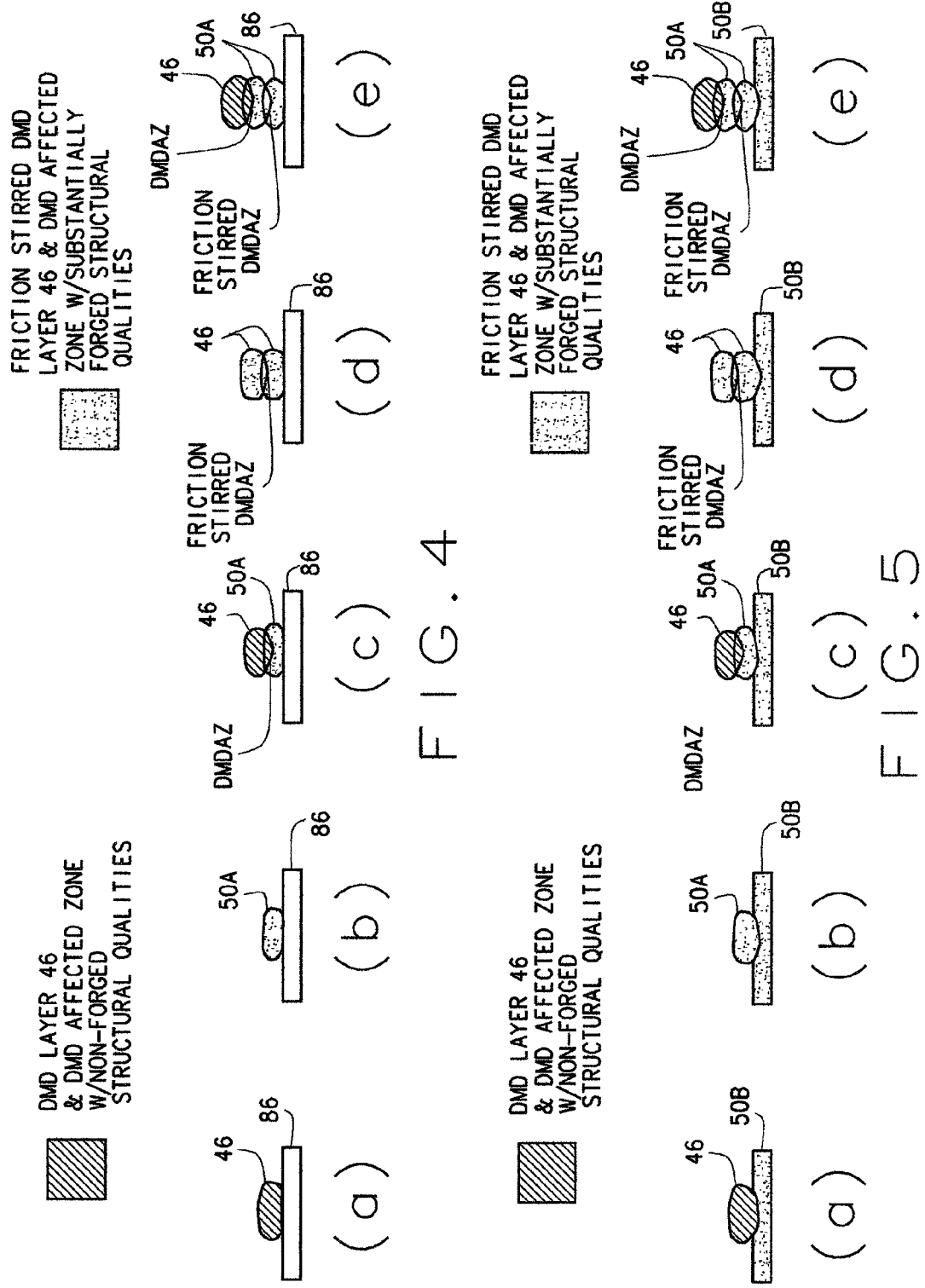

SYSTEMS AND METHODS FOR FABRICATING A DIRECT METAL DEPOSITION STRUCTURE HAVING FULLY FORGED STRUCTURAL QUALITIES

GOVERNMENT RIGHTS IN THE INVENTION

This invention was developed in the course of work under U.S. Air Force Contract FA8650-04-C-5704. The U.S. government may possess certain rights in the invention.

FIELD

The present teachings relate to systems and methods for fabricating a direct metal deposition structure having substantially fully forged structural qualities.

BACKGROUND

The statements in this section merely provide background information related to the present disclosure and may not constitute prior art.

Additive manufacturing, e.g., laser deposition, electron beam deposition or freeform manufacturing is a process of joining materials layer upon layer, as opposed to subtractive manufacturing methodologies, such as milling away portions of a larger structure. For example, additive manufacturing is often used for constructing models, prototypes or other objects having intricate geometric designs from 3D model data. That is, such additive manufacturing is a process by which complicated structures can be fabricated in layers where each successive layer is deposited on top of the previous layer. However, in many additive techniques, the bonding of the independent layers is typically of a low structural quality, i.e., the structural integrity, strength and durability of the resulting part is not of high quality.

Additionally, in various instances, attempts have been made to use additive manufacturing to add material to an existing substrate, structure or part. However, neither the added material nor the joint where the material has been added to existing structure possess sufficiently high structural qualities. Hence, many additive manufacturing processes have failed for repairing, or adding to, other exiting structures because, among other reasons, the additive manufacturing process does not bond to the existing structure. Therefore, the resulting aggregate structure generally does not have the same structural quality as the original structure being repaired, or having material added.

Metal additive manufacturing, e.g., laser deposition and electron beam deposition, is an additive process using high energy source, in which metal is added to the part or product, layer by layer, to rapidly manufacture or form the part or product to a predetermined free-form shape. It is a technique that can produce 100% dense functional metal parts directly from a CAD system and eliminate the need for intermediate steps. The microstructure obtained through this process is dependent on the laser deposition parameters which include the laser power, laser scanning speed, the powder feed rate etc. While able to produce good bonding to the substrate, when the substrate or a part to be repaired material is of very fine grain microstructure, the high energy source may affect the quality of these fine grain structures due to high temperature operation. Therefore this becomes the limitation of these types of metal additive manufacturing (laser deposition and electron beam deposition).

SUMMARY

In various embodiments, the present disclosure provides a method for fabricating a direct metal deposition (DMD) structure having substantially fully forged structural qualities, wherein the method includes depositing a layer of metallic material onto an existing metallic structure having a microstructure that provides the existing metallic structure with substantially fully forged structural qualities. The DMD layer has a microstructure that provides the DMD layer with non-forged structural qualities. The method additionally includes applying a friction stir process to the deposited DMD layer utilizing a friction stir device such that the deposited DMD layer and at least a DMD affected zone of the existing metallic structure are friction stirred to refine and homogenize the microstructure of the deposited DMD layer and at least the DMD affected zone of the existing metallic structure, thereby producing a non-forged aggregate structure having a microstructure that provides the aggregate structure substantially fully forged structural qualities.

In various other embodiments, the present disclosure provides a method for fabricating a direct metal deposition (DMD) structure having substantially fully forged structural qualities, wherein the method includes depositing, via a DMD device disposed within a processing cabinet of a direct metal deposition and friction stir system, a layer of metallic material onto an existing metallic structure. The existing metallic structure has a microstructure that provides the existing metallic structure with substantially fully forged structural qualities, and the DMD layer has a microstructure that provides the DMD layer with non-forged structural qualities. The method additionally includes creating, via heat from the deposited DMD layer, a DMD affected zone within the existing metallic structure adjacent where the deposited DMD layer has been deposited. The DMD affected zone comprises a portion of the existing metallic structure in which the microstructure has been altered by the heat to have non-forged structural qualities. Furthermore, the method includes selecting a friction stir tool connectable to a friction stir device, disposed within the processing cabinet of the direct metal deposition and friction stir system, to have a tip having a selected geometry and dimensions structured to provide a friction stir zone of a selected depth, width and shape that will encompass at least a portion of the deposited DMD layer and at least the DMD affected zone of the existing metallic structure. Still further, the method includes friction stirring the deposited DMD layer utilizing the selected friction stir tool to refine and homogenize the microstructure of the deposited DMD layer and at least the DMD affected zone of the existing metallic structure encompassed within the friction stir zone to produce a non-forged aggregate structure having a microstructure that provides substantially fully forged structural qualities.

In still other embodiments, the present disclosure provides a direct metal deposition (DMD) and friction stir system that is structured and operable to for fabricating a DMD structure having substantially fully forged structural qualities, wherein the system includes a processing cabinet and a DMD device disposed within the processing cabinet. The DMD device is structured and operable to deposit a layer of metallic material onto an existing metallic structure. The existing metallic structure has a microstructure that provides the existing metallic structure with substantially fully forged structural qualities and the DMD layer has a microstructure that provides the DMD layer with non-forged structural qualities. Heat from the deposited DMD layer creates a DMD affected zone within the existing metallic structure adjacent where the deposited DMD layer has been deposited, wherein the DMD affected zone comprises a portion of the existing metallic structure in which the microstructure has been altered by the heat to have non-forged structural qualities. The system additionally includes a friction stir device disposed within the processing cabinet. The friction stir device includes a selected friction stir tool, and the selected friction stir tool includes a tip having a selected geometry and dimensions. The friction stir device is structured and operable to friction stir the deposited DMD layer utilizing the selected friction stir tool such that the selected geometry and dimensions of the selected friction stir tool create a friction stir zone of a desired depth, width and shape that encompasses at least a portion of the deposited DMD layer and at least the DMD affected zone of the existing metallic structure. Moreover, by friction stirring the friction stir zone that encompasses at least a portion of the deposited DMD layer and at least the DMD affected zone of the existing metallic structure, the microstructure of the deposited DMD layer and at least the DMD affected zone of the existing metallic structure are refined and homogenized to produce a non-forged aggregate structure having a microstructure that provides substantially fully forged structural qualities.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 2 is a schematic of the direct metal deposition and friction stir system shown in FIG. 1 including a processing cabinet in which a direct metal deposition assembly, a friction stir device and an X-Y stage of the direct metal deposition and friction stir system are disposed, in accordance with various embodiments of the present disclosure.

Figure 1:
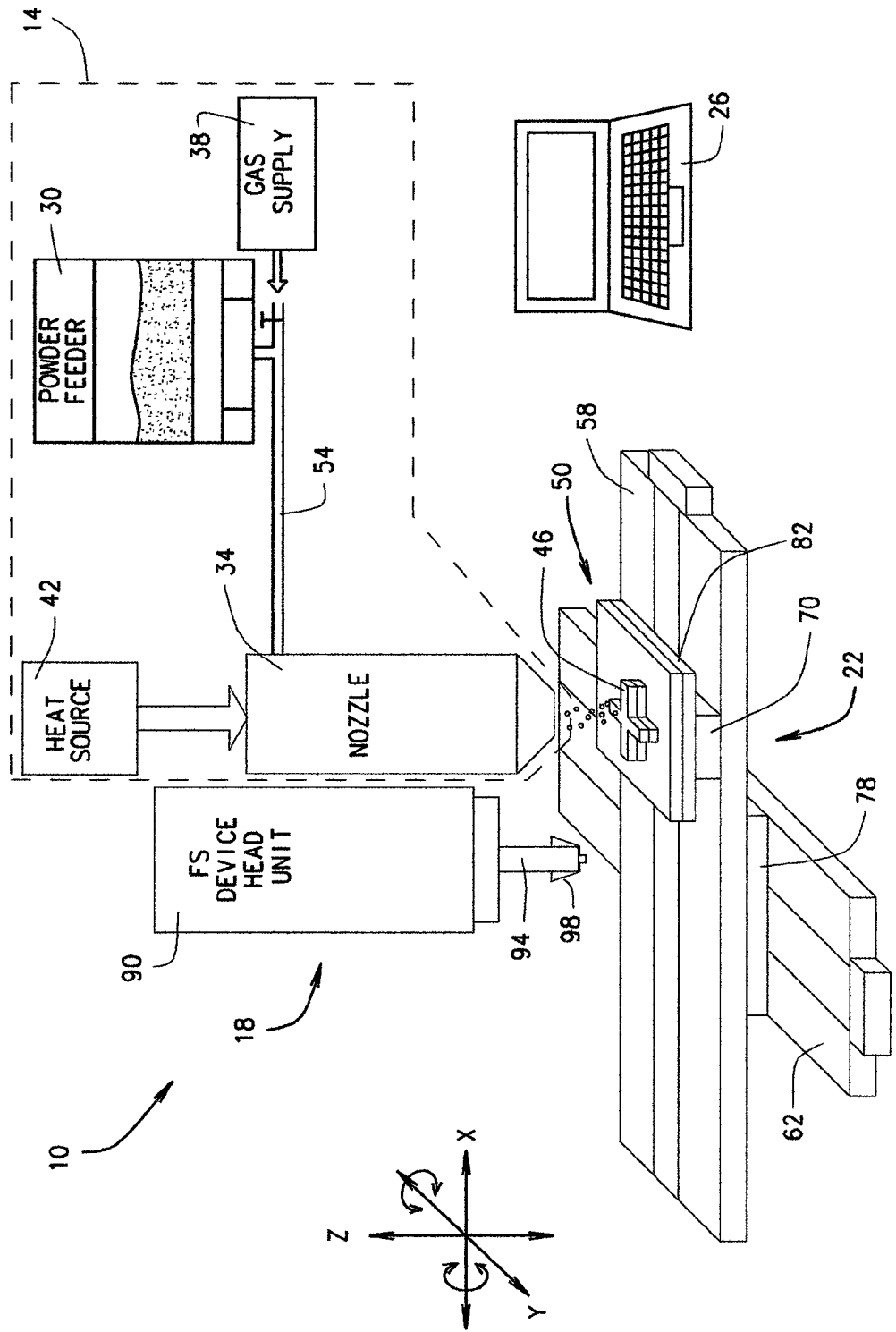
FIG. 1 is a schematic of a direct metal deposition and friction stir system, in accordance with various embodiments of the present disclosure.
Figure 3:
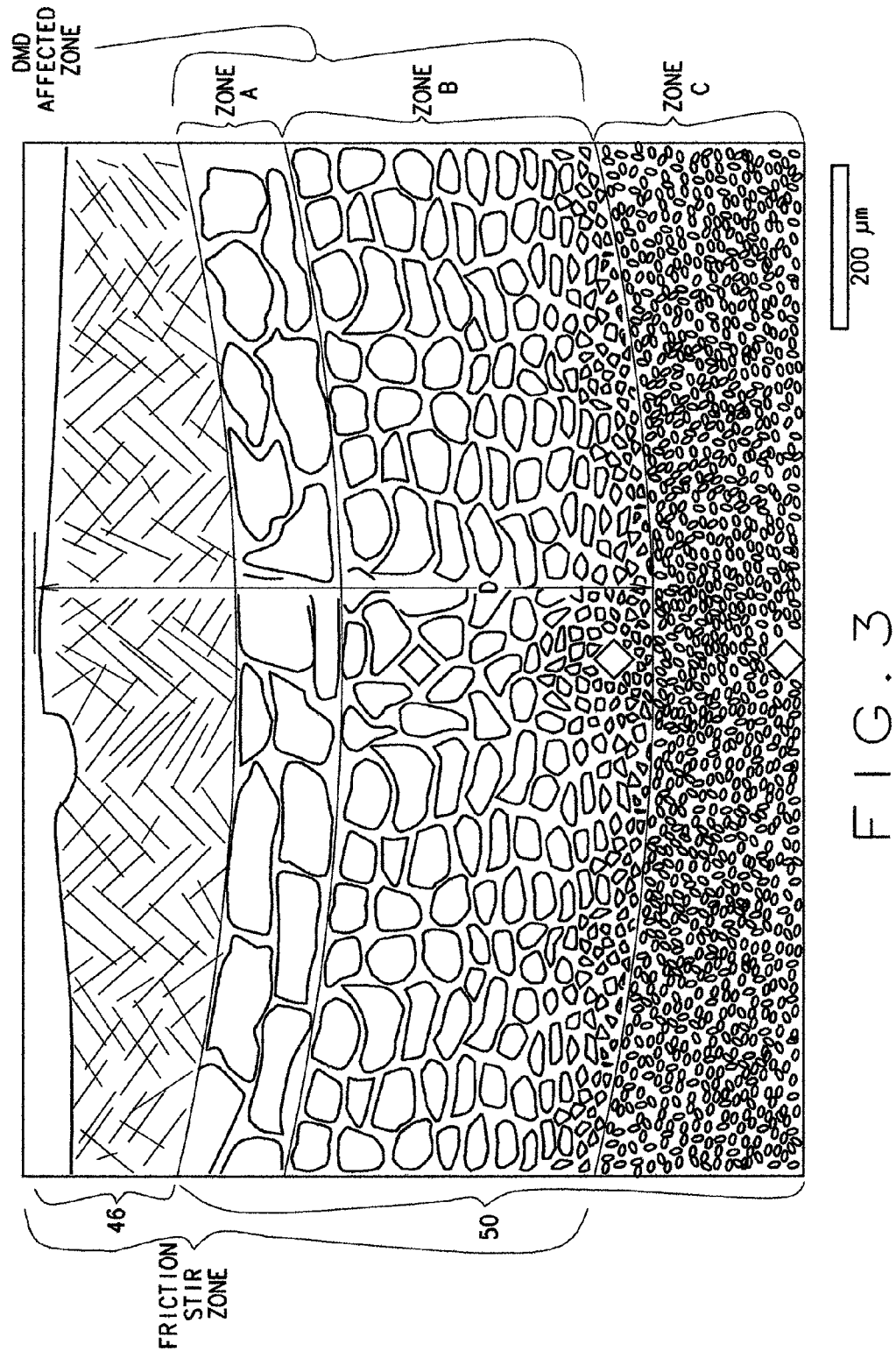

FIG. 3 is an exemplary cross-sectional view of a direct metal deposition layer deposited onto an existing metallic structure, via the direct metal deposition and friction stir system shown in FIG. 1, and the various zones of the resulting microstructure prior to being friction stirred by the direct metal deposition and friction stir system shown in FIG. 1, in accordance with various embodiments of the present disclosure.

Figure 3A:
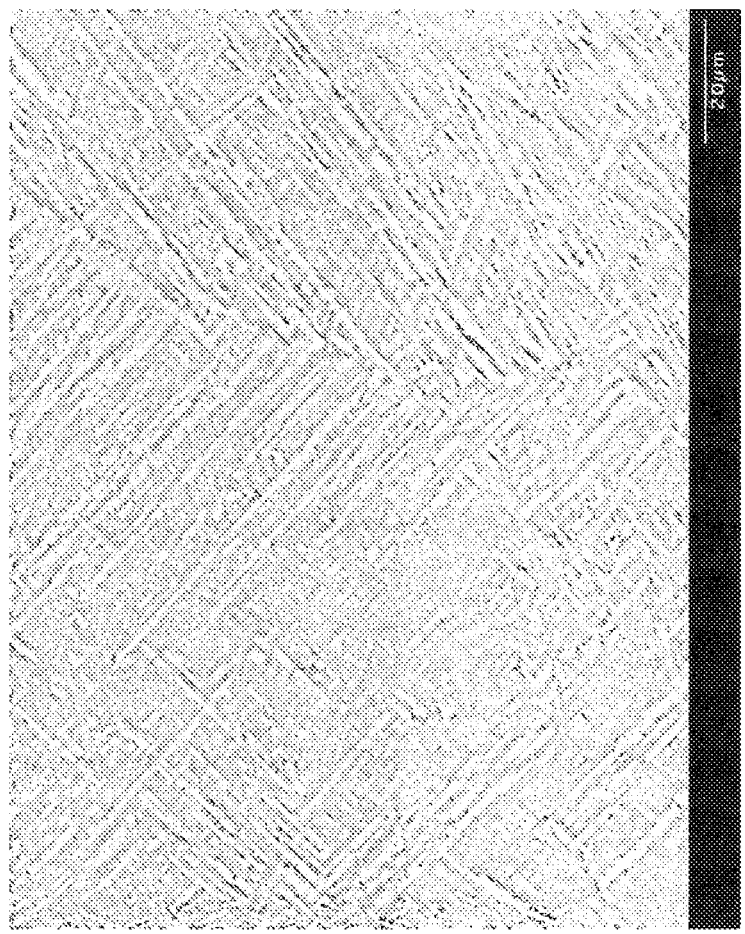

FIG. 3A is an exemplary SEM view of a cross-section of a direct metal deposition layer deposited onto an existing metallic structure, via the direct metal deposition and friction stir system shown in FIG. 1, prior to being friction stirred by the direct metal deposition and friction stir system shown in FIG. 1, in accordance with various embodiments of the present disclosure.

Figure 3B:
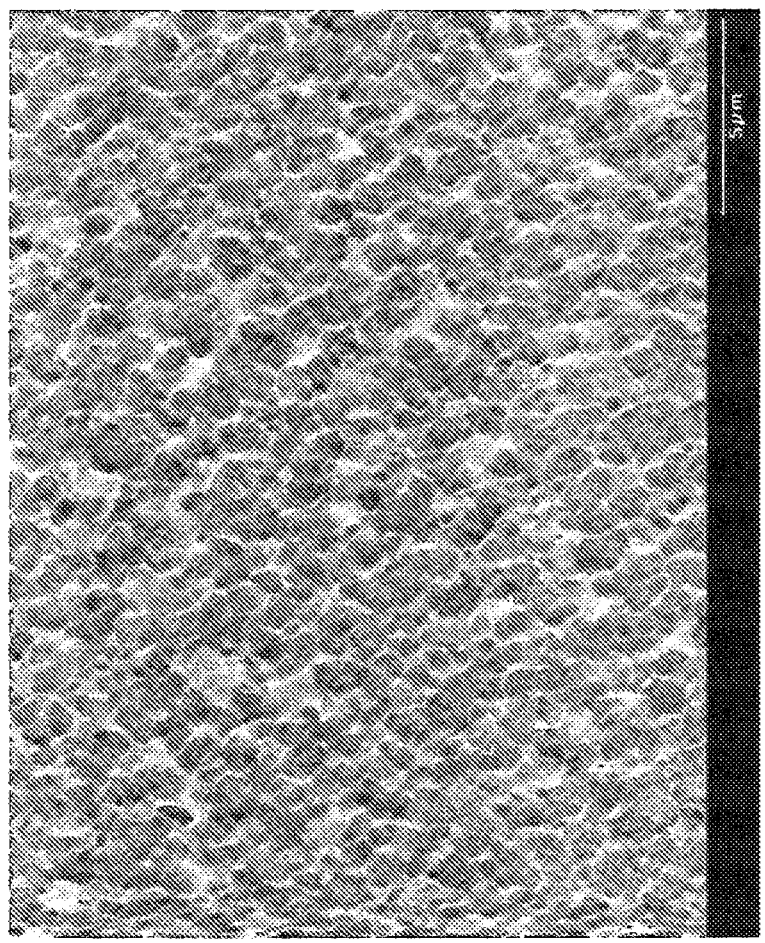

FIG. 3B is an exemplary SEM view of a cross-section of a friction stirred direct metal deposition layer deposited onto an existing metallic structure and friction stirred, via the direct metal deposition and friction stir system shown in FIG. 1, in accordance with various embodiments of the present disclosure.

FIG. 4 is an exemplarily illustration showing a progressive fabrication sequence for fabricating a freeform structure utilizing the direct metal deposition and friction stir system shown in FIG. 1, in accordance with various embodiments of the present disclosure.

FIG. 5 is an exemplarily illustration showing a progressive fabrication sequence for depositing and friction stirring one or more direct metal deposit layers to an existing forged metal structure utilizing the direct metal deposition and friction stir system shown in FIG. 1, in accordance with various embodiments of the present disclosure.

Figure 6:
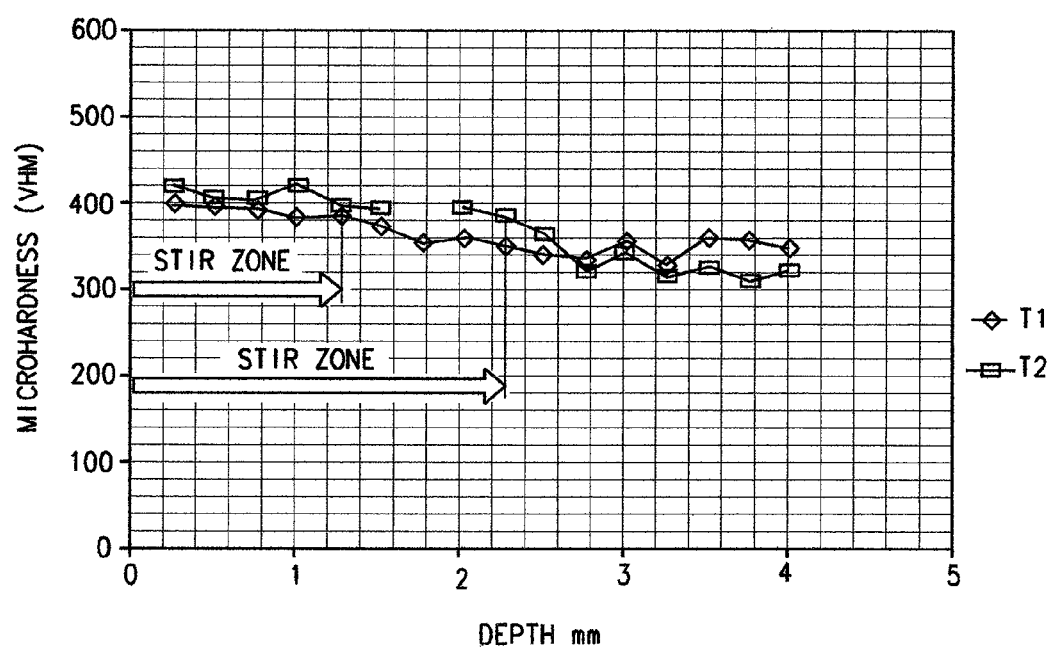

FIG. 6 is an exemplary graphical illustration showing the results of microhardness testing for a friction stir zone of a Ti-6Al-4V direct metal deposition layer deposited onto a forged metal structure and friction stirred using the direct metal deposition and friction stir system shown in FIG. 1, in accordance with various embodiments of the present disclosure.

Figure 7:
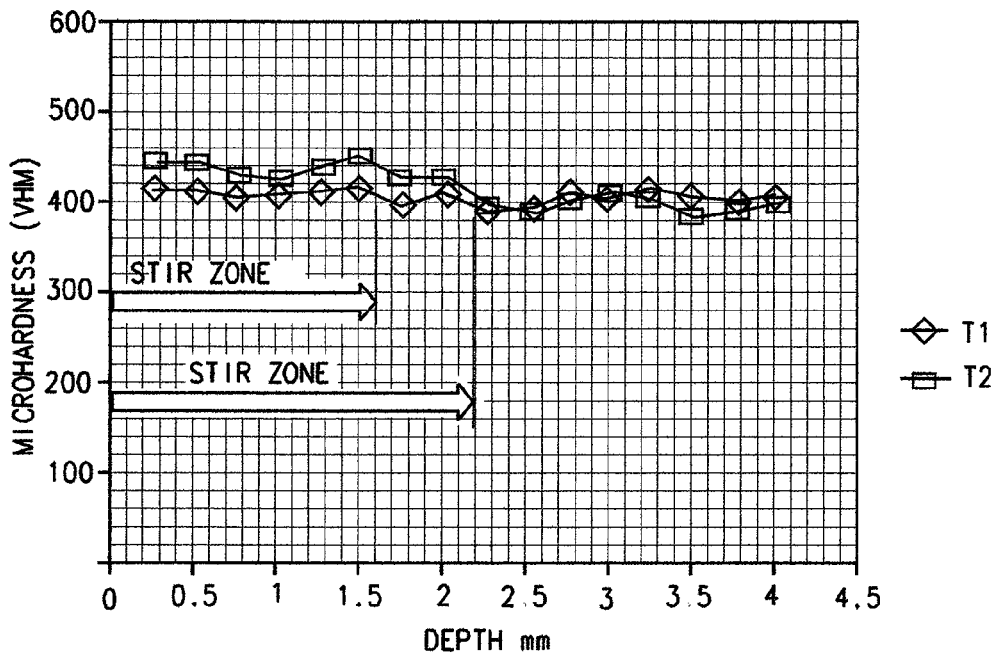

FIG. 7 is an exemplary graphical illustration showing the results of microhardness testing for a friction stir zone of a Ti-6Al-4V direct metal deposition layer deposited onto a previously deposited and friction stirred Ti-6Al-4V direct metal deposition layer and friction stirred using the direct metal deposition and friction stir system shown in FIG. 1, in accordance with various embodiments of the present disclosure.

Figure 8:
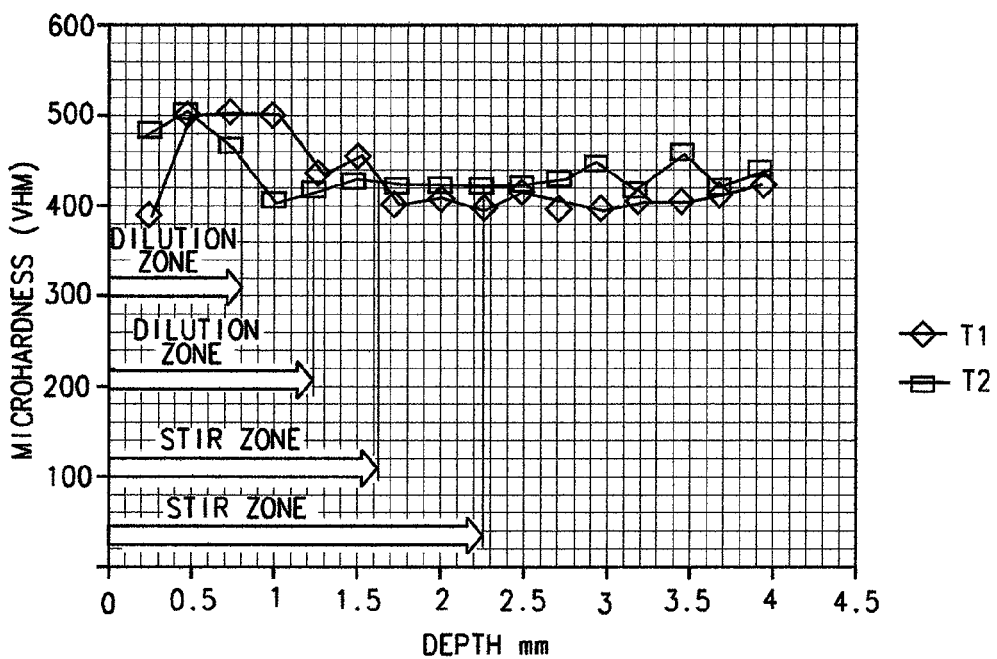

FIG. 8 is an exemplary graphical illustration showing the results of microhardness testing for a friction stir zone of a double pass Ti-6Al-4V direct metal deposition layer deposited onto a previously deposited and friction stirred Ti-6Al-4V direct metal deposition layer and friction stirred using the direct metal deposition and friction stir system shown in FIG. 1, in accordance with various embodiments of the present disclosure.

Figure 9:
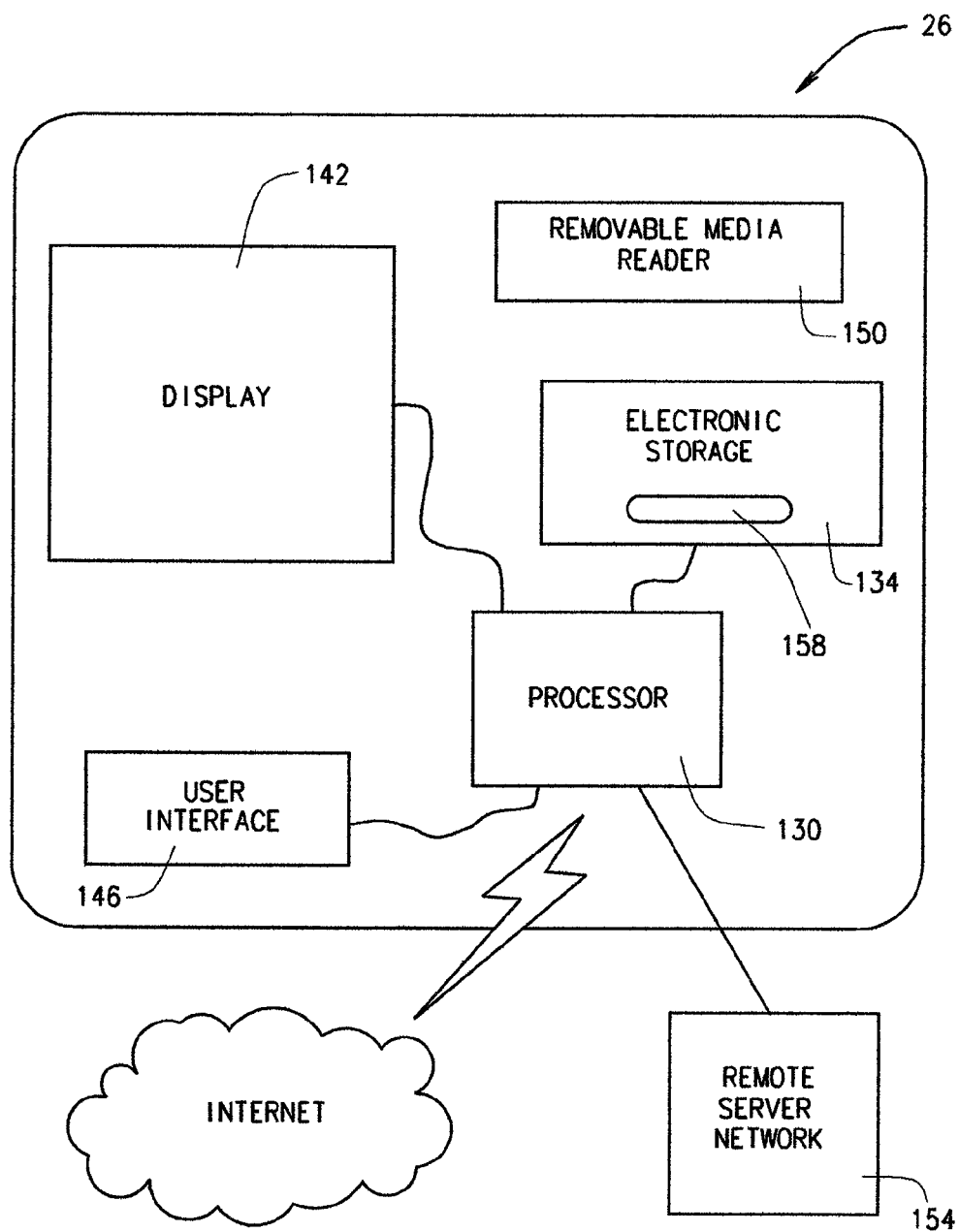

FIG. 9 is a block diagram of a control system of the direct metal deposition and friction stir system shown in FIG. 1, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

Referring to FIG. 1, a direct metal deposition and friction stir system 10 is provided for fabricating a direct metal deposition (DMD) structure having substantially fully forged structural qualities. The system 10 includes a DMD assembly 14, a friction stir device 18, an X-Y stage 22 and a control system 26. As used herein, fully forged structural qualities mean structural qualities, e.g., durability, hardness, ductility, tensile strength, shear strength, etc., substantially similar to those of a fully forged metal structure.

In various embodiments, the DMD assembly 14 includes a powder feeder 30, a deposition nozzle 34, a gas supply 38 and a heat source 42. Generally, the DMD assembly 14 is structured and operable, as controlled by the control system 26, to deposit a layer 46, or bead, of molten metallic material onto an existing metallic structure 50. More particularly, the powder feeder 30 is structured and operable to retain a metallic powder and dispense the metallic powder into a gas/powder feed conduit 54. The metallic powder is dispensed from the powder feeder 30 at a controlled rate and mixed with a controlled amount of inert gas, e.g. argon gas, to carry the powder from the powder feeder 30 to the deposition nozzle 34, via the gas/powder feed conduit 54. Subsequently, the gas/powder mix is substantially simultaneously dispensed from the deposition nozzle 34, melted via a concentrated heat signal emitted from the heat source 42 and deposited onto the existing metallic structure 50. As the melted metallic powder is being deposited onto the existing metallic structure 50, the existing metallic structure 50 is moved in a desired pattern by the X-Y stage 22, as controlled by the control system 26, to form the DMD layer 46 on the existing metallic structure 50.

More specifically, movement of the X-Y stage 22 is controlled by the control system 26 in accordance with a CAD (computer aided drafting) model loaded into the control system 26. Therefore, the DMD layer 46 can be deposited onto the existing metallic structure 50 in any desired pattern to form a resulting structure having any desired geometry. In various embodiments, the X-Y stage 22 can be a two-dimensional translation mechanism, including an X axis translating track 58 and a Y axis translating track 62. The X-Y stage 22 is operable to bidirectionally move a first carriage 70 along the length of the X axis translating track 58, as controlled by the control system 26. The X-Y stage 22 is further operable to bidirectionally move a second carriage 78 along the length of the Y axis translating track 62, as controlled by the control system 26. The X axis translating track 58 is mounted to the second carriage 78 and a presentation platform 82 is mounted to the first carriage 70.

Hence, via coordinated operation of the X and Y axis translating tracks 58 and 62, as controlled by the control system 26, the presentation platform 82 can be moved in any direction within an X-Y coordinate system defined by the travel distances of the first and second carriages 70 and 78 along the respective X and Y axis translating tracks 58 and 62. Moreover, the existing metallic structure 50, or a substrate 86 (shown in FIG. 1A) on which the existing metallic structure 50 has been disposed, is mounted on the presentation platform 82 such that the DMD layer 46 can be deposited onto the existing metallic structure 50 in any desired pattern. Subsequently, the deposition nozzle 34 and/or the X-Y stage 22 can respectively be raised and/or lowered along a Z axis and subsequent DMD layer 46 can be added to the previous DMD layer 46. Additionally, in various embodiments, the X-Y stage 22 can be bidirectionally rotated about the X axis and/or the Y axis.

Figure 1A:
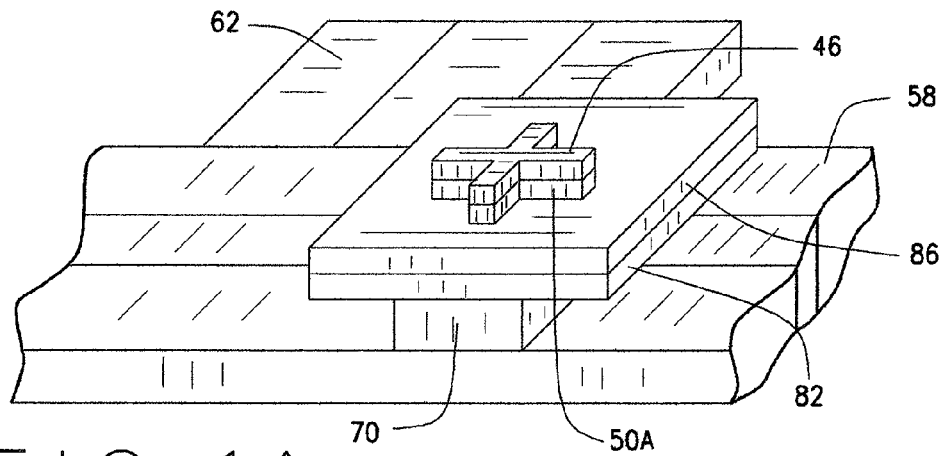
FIG. 1A is an illustration of an existing metallic structure having a direct metal deposit layer, or bead, deposited thereon utilizing the direct metal deposition and friction stir system shown in FIG. 1, in accordance with various embodiments of the present disclosure.
Figure 1B:
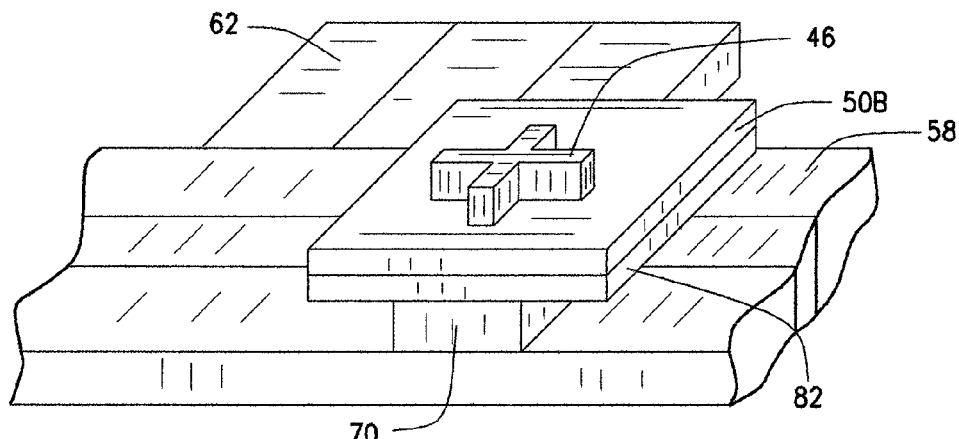
FIG. 1B is an illustration of an existing metallic structure having a direct metal deposit layer, or bead, deposited thereon utilizing the direct metal deposition and friction stir system shown in FIG. 1, in accordance with various other embodiments of the present disclosure.

Referring to FIGS. 1A and 1B, the existing metallic structure 50 can comprise any metallic structure on which it is desirable and suitable to deposit the metallic layer 46 via the DMD assembly 14. For example, in various embodiments, the existing metallic structure 50 can comprise a previously deposited DMD layer 50A disposed on a substrate 86 that is mounted to the presentation platform 82, as exemplarily illustrated in FIG. 1A. In such embodiments, the microstructure of the previously deposited DMD layer has been recrystallized using the friction stir device 18 to provide the existing metallic structure 50A, i.e., the previously deposited DMD layer, with substantially fully forged qualities, as described below. Moreover, after the DMD layer 46 is deposited onto the existing metallic structure 50A, the DMD layer 46 is friction stirred using the friction stir device 18 to recrystallize the microstructure of the DMD layer 46 and at least a portion of the existing metallic structure 50A such that the DMD layer 46 and the portion of the existing metallic structure 50A have substantially fully forged qualities.

As used herein, recrystallization should be understood to mean the process of completely destroying the prior microstructure by a thermomechanical means and inducing entirely new crystals to form in a strain free, preferred orientation free microstructure. That is, a process by which deformed grains are replaced by a new set of undeformed grains that nucleate and grow until the original grains have been entirely consumed. Still further, the formation of a new grain structure in a deformed material by the formation and migration of high angle grain boundaries driven by the stored energy of deformation.

Furthermore, once a DMD layer 46 has been deposited and friction stirred, the recrystallized DMD layer 46 can become the existing metallic structure 50A on which a subsequent DMD layer 46 can be deposited and then friction stirred. Accordingly, additional DMD layers 46 can be deposited and friction stirred to freeform a resulting structure of any desired geometry, whereby the resulting aggregate structure, i.e., the freeform structure, has substantially fully forged qualities. Once the freeform structure has been fabricated via operation of the direct metal deposition and friction stir system 10, as described herein, the freeform structure can be removed from the substrate 86.

Alternatively, in various embodiments, the existing metallic structure 50 can comprise a preexisting forged metal structure or substrate 50B, as exemplarily illustrated in FIG. 1B. In such embodiments, the existing metallic structure 50B, i.e., the preexisting forged metal structure, can be mounted to the presentation platform 82. As described further below, after the DMD layer 46 is deposited onto the existing metallic structure 50B, the DMD layer 46 is friction stirred using the friction stir device 18 to recrystallize the DMD layer 46 and at least a portion of the existing metallic structure 50B such that the DMD layer 46 and the portion of the existing metallic structure 50B have substantially fully forged qualities.

In such embodiments, the preexisting metallic structure 50 can have generally any shape and the direct metal deposition and friction stir system 10 can be operated, as described herein, to repair a stress crack or fissure in the existing metallic structure 50B. Or, in other implementations, once a DMD layer 46 has been deposited and friction stirred, the recrystallized DMD layer 46 can become an existing metallic structure 50A on which a subsequent DMD layer 46 can be deposited and then friction stirred. Thereafter, additional DMD layers 46 can be deposited and friction stirred to form an appending structure of any shape that is integrally formed with the existing metallic structure 50B such that the resulting aggregate structure, i.e., the existing metallic structure 50A with the integrally formed appending structure, has substantially fully forged structural qualities.

The metallic powder used to form the DMD layer 46 can be any metallic powder suitable for DMD, such as Ti-6Al-4V, Ni-based alloys. Additionally, the heat source 42 can be any heat source structured and operable to provide a concentrated heat signal capable of melting the respective metallic powder as the powder is dispensed from the deposition nozzle 34 and deposited onto the existing metallic structure 50. For example, in various embodiments, the heat source 42 can comprise an electron beam generator operable to emit an electron beam, or signal, having an intensity sufficient to melt the powder. In such instances, the layer 46 is deposited via electron beam deposition. Or, in various other embodiments, the heat source can comprise a laser operable to emit a light signal, or beam, having an intensity sufficient to melt the powder. In such instances, the layer 46 is deposited via laser deposition.

Referring now to FIGS. 1 and 10, the friction stir device 18 generally includes a head unit 90 that is structured and operable to rotationally drive a friction stir tool 94. Particularly, the head unit 90 is structured and operable to rotate the friction stir tool 94 at selectable rotation rate. For example, in various embodiments the head unit 90 is structured and operable to rotate the friction stir tool 94 at between approximately 100 and 1000 RPMs, for example, between 250 and 350 RPMs, e.g., approximately 300 RPMs, can be used for Ti64. The friction stir device 18 is mounted to a Z axis linear stage, actuator or piston (not shown) that is structured and operable, as controlled by the control system 26, to bidirectionally move the friction stir tool along the Z axis.

In various embodiments, the friction stir device 18 is disposed in close proximity to the deposition nozzle 34 such that the X-Y stage 22 can be operated, as controlled by the control system 26, to move the entire DMD layer 46 beneath the tool 94 without relocating the presentation platform 82 or the X-Y stage 22. Alternatively, in various embodiments, the friction stir device 18 and the deposition nozzle 34 are not in close proximity to each other, such that after the DMD layer 46 has been deposited, the deposition nozzle 34 must be moved away from the DMD layer 46 and the friction stir device 18 moved into a position over the DMD layer 46 such that the DMD layer can be friction stirred. Or, after the DMD layer 46 has been deposited, the X-Y stage 22 must be moved from the location where the presentation platform 82 is properly positioned and aligned beneath the deposition nozzle 34 to a different location where the presentation stage 82 is properly positioned and aligned beneath the friction stir tool 94.

In operation, after a DMD layer 46 has been deposited onto the existing metallic structure 50, the DMD layer 46 is moved beneath a tip 98 of the friction stir tool 94. The friction stir device 18 is then lowered, via Z axis actuator, to place the tip 98 in contact with the DMD layer 46 such that a pin 102 of the tool tip 98 is substantially laterally centered on the DMD layer 46. Alternatively, the X-Y stage 22 can be raised to place the tool tip 98 in contact with the DMD layer 46. Importantly, the tool tip 98 in placed in contact with the DMD layer 43 with a selected amount of pressure, as controlled by the control system 26. For example, the tool tip 98 can be place in contact with the DMD layer 46 with between approximately 2,000 and 20,000 psi, e.g., approximately 12,000 psi.

While maintaining the selected rotation rate of the friction stir tool 94, and while the selected amount of pressure of the tool tip 98 is maintained on the DMD layer 46, the X-Y stage is operated, as controlled by the control system 26, to moved the presentation stage 82 and the DMD layer 46 such that the tool tip 98 is moved along and through a top surface of the DMD layer 46. More particularly, the tool tip 98 is moved along and through the top surface of the DMD layer 46 at the selected rotation rate and pressure to friction stir the DMD layer 46 and at least a portion of the exiting metallic structure 50 such that microstructure of the DMD layer and at least a portion of the exiting metallic structure 50 is recrystallized. Still more specifically, as the tool tip 98 is moved along and through the top surface of the DMD layer 46 at the selected rotation rate and pressure, the DMD layer 46 and at least a portion of the exiting metallic structure 50 are mechanically heated and plastically deformed, thereby recrystallizing the microstructure of the DMD layer 46 and at least a portion of the exiting metallic structure 50.

That is, as the rotating friction stir tool tip 98 engages the surface of the DMD layer 46, the contact friction and rotation of the tip 98 heat and twist a stir zone within the DMD layer 46 and at least a portion of the exiting metallic structure 50, thereby forcing the material within the stir zone to deform plastically. As used herein, the stir zone refers to portions of the DMD layer 46 and the existing metallic structure 50 that are thermo-mechanically affect by the heat and high shear strains induced by the friction stir tool 94 when the tip 98 is placed in contact with the DMD layer 46 at the selected rotation rate and applied pressure. The heat and high shear strains induced effectively stir the material within the stir zone and dynamically recrystallize the microstructure of the material within the stir zone. Hence, the microstructures of the DMD layer 46 and the existing metallic structure 50 within the stir zone are recrystallized. Moreover, microstructures of the DMD layer 46 and the existing metallic structure 50 within the stir zone are recrystallized without subsequent heat treatment, e.g., heating via a torch or other heating element.

Importantly, as described further below, prior to being friction stirred the DMD layer 46 has a microstructure, e.g., a basketweave structure, that provides the DMD layer 46 with non-forged structural qualities. However, the friction stir process, as described herein, recrystallizes the microstructure of the DMD layer 46 to improve the mechanical properties such that the DMD layer 46 has substantially fully forged structural qualities. For example, in various embodiments, the microstructure of the deposited DMD layer 46 is recrystallized to have an equiaxed a grain structure that provides substantially fully forged structural qualities.

Figure 1C:
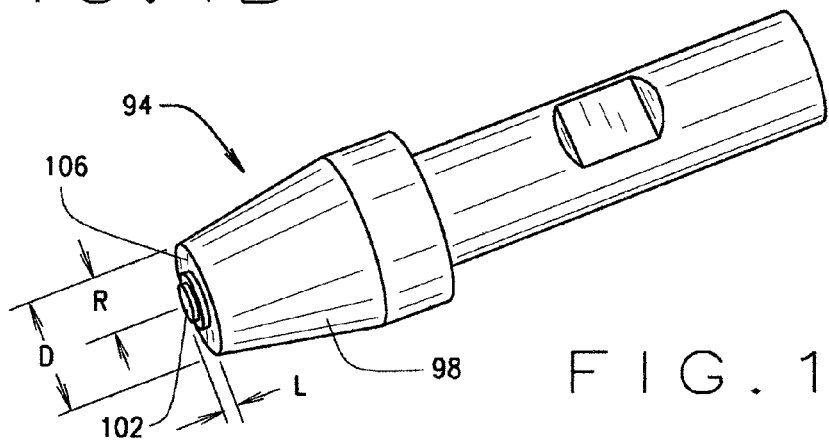
FIG. 1C is an isometric view of a friction stir tool included in a friction stir device of the direct metal deposition and friction stir system shown in FIG. 1, in accordance with various embodiments of the present disclosure.

Referring particularly to FIG. 1C, the tool tip 98 includes the pin 102 and a shoulder 106. Generally, a length L of the pin 102 dictates the depth of the stir zone and a radial length R of the shoulder 106 dictates the width of the stir zone and the amount of frictional heat generated by the rotating tool tip 98. Generally, the longer the pin 102 is, the deeper the resulting stir zone will be, and the broader the shoulder 106 is, the wider the stir zone will be. Additionally, the broader the shoulder 106 is, the greater the heat input will be and the greater the applied rotational forces, i.e., shear strains, will be to the DMD layer 46 and the existing metallic structure 50. In various embodiments, a diameter of the shoulder 106 is substantially equal to a width of the DMD layer 46.

Additionally, the geometry of the pin 102 can affect the depth and shape of the stir zone. For example, in various embodiments, the pin 102 can comprise a single cylindrical structure extending from the distal end of the tip 98. Or, in other various embodiments, the pin can comprise concentric cylindrical structures of different heights and different diameters extending from the distal end of the tip 98, as illustrated in FIG. 1C. Hence, the fiction stir tool 94 is selected to have a shoulder with a particular radial length R and a pin 102 with a particular length L and geometry such that, at the selected tool rotation and applied pressure, the friction stir tool 94 will produce a stir zone having a desired shape and depth. Additionally, the travel rate of the friction stir tool tip 98 along and through the surface of the DMD layer 46 can affect the shape and depth of the stir zone. Therefore, in addition to the tip length and geometry and the shoulder radial length, the travel rate of the friction stir tool tip 98, as controlled by the control system 26, is selected to produce a stir zone having a desired depth, with and shape. Furthermore, in various embodiments, the depth, width and material properties, or characteristics, of the DMD layer 46, e.g., the thermal mechanical properties and microstructure composition of the DMD layer 46 material, are taken into consideration when selecting the pin length, the pin geometry and the shoulder radial length.

Referring now to FIG. 2, in various embodiments, the direct metal deposition and friction stir system 10 can further include a processing cabinet 110 in which the direct metal deposition assembly 14, the friction stir device 18 and the X-Y stage 22 are disposed. Hence, in such embodiments, the direct metal deposition and friction stir system 10 is a stand alone system that includes both the direct metal deposition assembly 14, the friction stir device 18, and the X-Y stage 22, wherein the X-Y stage 22 is used to move the existing metallic structure 50 beneath the deposition nozzle 34 during the DMD process and also to move the friction stir tool along and through the DMD layer 46 during the friction stir process.

FIG. 3 provides an exemplary cross-sectional view of a DMD layer 46 deposited onto an existing metallic structure 50, via the direct metal deposition and friction stir system 10. As described above, the existing metallic structure 50 can comprise a previously deposited DMD layer 46 that has been friction stirred to recrystallize the microstructure and provide the non-forged DMD layer with substantially fully forged structural qualities, herein referred to as the existing metallic structure 50A. Or, the existing metallic structure 50 can comprise a preexisting forged metal structure or substrate, herein referred to as the existing metallic structure 50B. For simplicity, general reference to the existing metallic structure, i.e., the existing metallic structure 50A and/or the existing metallic structure 50B, will be referred to herein as the existing metallic structure 50.

When the DMD layer 46 is deposited onto the existing metallic structure 50, heat from the DMD layer 46 is conducted by the existing metallic structure 50 and alters the microstructure of existing metallic structure 50. More particularly, the conducted heat dissipates as a function of depth penetration within the existing metallic structure 50. Therefore, the conducted heat alters various portions, or zones, of the microstructure of the existing metallic structure 50 to varying degrees. As described above, prior to the deposition of the DMD layer 46, the existing metallic structure 50 has a microstructure that provides substantially fully forged structural qualities. As the DMD layer 46 is deposited onto the existing metallic structure 50, heat from the deposited DMD layer 46 substantially melts a top portion of the existing metallic structure 50, exemplarily illustrated as Zone A in FIG. 3. In the embodiments, wherein the existing metallic structure 50 comprises a recrystallized DMD layer 46, i.e., existing metallic structure 50A, Zone A can also be referred to as the dilution zone. Alternatively, in the embodiments, wherein the existing metallic structure 50 comprises a forged metal structure, i.e., existing metallic structure 50B, Zone A can also be referred to as the thermo-mechanically affected zone (TMAZ). The heat absorbed from the DMD layer 46 alters the microstructure within Zone A, e.g., the grain size within Zone A significantly increases, such that Zone A of the existing metallic structure 50 no longer provides substantially fully forged structural qualities.

The heat from the deposited layer 46 additionally affects the microstructure within a Zone B of the existing metallic structure 50. Zone B can also be referred to as the heat affected zone (HAZ). Although to a somewhat lesser degree, the heat absorbed from the DMD layer 46 also alters the microstructure within Zone B, e.g., the grain size within Zone B increases, such that Zone B of the existing metallic structure 50 also no longer provides substantially fully forged structural qualities. Beneath Zone B is a Zone C wherein, due to the dissipation of heat, the microstructure of the existing metallic structure 50 remains substantially unaltered such that the microstructure of the existing metallic structure 50 within Zone C retains the substantially fully forged structural qualities.

For example, experimental data using the direct metal deposition and friction stir system 10, as described herein, to deposit a DMD layer 46 of Ti-6Al-4V onto an existing metallic structure 50A, i.e., a previously deposited and stirred DMD layer 46, revealed that the grains in Zone A were approximately 250 um wide and an average grain size of 50 um was observed in Zone B, at a depth 250 um below Zone A. This was followed by a further decrease in grain size to 25 um over the next 250 um within Zone B. It was further observed that the deposition of the DMD layer 46 onto the existing metallic structure 50A did not completely eliminate the recrystallized microstructure of the existing metallic structure 50A. Particularly, it was observed that the microstructure within Zone C remained unaltered and recrystallized, and that Zone C comprised approximately 50% to 60% of the existing metallic structure 50A.

Zone A and Zone B will be cumulatively referred to herein as the DMD affected zone (DMDAZ). Depending on the dimensions, i.e., depth and width, and thermo-mechanical properties of the existing metallic structure 50, the DMD affected zone can extend into the existing metallic structure 50 to a depth of 1 mm, 2 mm or more.

Hence, deposition of the DMD layer 46 onto the existing metallic structure 50 having a microstructure that provides substantially fully forged structural characteristics, alters the microstructure of at least a portion of the existing metallic structure 50, i.e., at least the DMD affected zone, such that the altered microstructure portion no longer provides fully forged structural characteristics. Additionally, as described above, the microstructure of the DMD layer 46 does not provide substantially fully forged structural qualities. For example, as illustrated in FIG. 3A, in various embodiments, the DMD layer 46 microstructure can have a basketweave structure having alternating alpha ($\alpha$) and beta ($\beta$) laths oriented to the same crystal orientation over a large distance. Therefore, such a microstructure is limited in toughness and fatigue characteristics and does not provide substantially fully forged structural qualities.

To recrystallize the microstructure of the DMD layer 46 and at least the DMD affected zone of the existing metallic structure 50, the friction stir device 18 is utilized, as described above. More particularly, based on the known material characteristics and dimensions of the DMD layer 46 the existing metallic structure 50, the friction stir tool 94 is selected to have a tip 98 that will generate a friction stir zone that encompasses at least a portion of the DMD layer 46 and the DMD affected zone of the existing metallic structure 50. For example, in various embodiments, the friction stir tool 94 is selected to have a tip 98 structured to generate a friction stir zone having a minimum depth D that encompasses the DMD layer 46 and at least the DMD affected zone of the existing metallic structure 50. Although the friction stir zone may encompass only a portion of the DMD layer 46 and a portion of the DMD affected zone, it is envisioned that in various embodiments, the friction stir zone will encompass substantially the entire DMD layer 46 and substantially the entire DMD affected zone. Hence, for simplicity and clarity, hereafter, the friction stir zone will be referred to as encompassing substantially the entire DMD layer 46 and at least the entire DMD affected zone of the existing metallic structure 50.

As described above, the friction stir process will recrystallize the microstructure of the DMD layer 46 and at least the DMD affected zone of the existing metallic structure 50 such that the microstructure of the DMD layer 46 and the DMD affected zone will have substantially fully forged structural qualities. More particularly, utilizing the selected friction stir tool 94 to friction stir the DMD layer and at least the DMD affected zone of the existing metallic structure 50, the microstructure of the DMD layer and the DMD affected zone are refined and homogenized, i.e., recrystallized, to provide the DMD layer and DMD affected zone with substantially fully forged structural qualities. For example, as illustrated in FIG. 3B, the microstructure of the friction stirred DMD layer 46 is refined and homogenized such that the α and beta β laths are equiaxed and the grain size is significantly smaller than prior to friction stirring (e.g., compare to the grain size shown in FIG. 3A, noting the difference in micro markers in FIGS. 3A and 3B).

Additionally, the friction stirring integrates the microstructures of the DMD layer and the DMD affected zone such that the DMD layer and the DMD affected zone are mixed and bonded together. Therefore, since Zone C of the existing metallic structure 50 maintains substantially fully forged structural qualities, the entire aggregate structure, i.e. the entire existing metallic structure 50 and DMD layer 46, will have substantially fully forged structural qualities. More particularly, the resulting aggregate structure produced by the direct metal deposition and friction stir system 10 is a non-forged structure that has substantially fully forged structural qualities.

Referring now to FIGS. 1A and 4, as described above, in various embodiments, the direct metal deposition and friction stir system 10 can be employed to fabricate a freeform structure having substantially forged structural qualities. In such embodiments, the existing metallic layer 50 comprises a previously deposited DMD layer 46 in which the microstructure has been recrystallized using the friction stir device 18, i.e., the existing metallic layer 50A. FIG. 4 exemplarily illustrates a fabricating sequence of such a freeform structure utilizing the direct metal deposition and friction stir system 10. Initially, a DMD layer 46 is deposited onto a substrate 86 utilizing the DMD assembly 14. As described above, the deposited DMD layer 46 has a microstructure that has non-forged structural qualities, as indicated at (a) of FIG. 4. Then, the deposited DMD layer 46 is friction stirred utilizing the friction stir device 18 having a tool tip 98 particularly structured to friction stir substantially the entire DMD layer 46. Therefore, as described above, the microstructure of substantially the entire DMD layer 46 is refined and homogenized, i.e., recrystallized, to provide the recrystallized DMD layer 46 with substantially fully forged structural qualities, as indicated at (b) of FIG. 4.

Next, a subsequent, or new, DMD layer 46 is deposited on the recrystallized DMD layer, i.e., on the existing metallic structure 50A. In various embodiments, prior to friction stirring of the DMD layer 46, at top portion of the DMD layer 46 can be milled, via a milling system (not shown) included in the direct metal deposition and friction stir system 10 in order to provide a substantially flat top surface on the DMD layer 46 for the friction stir tool tip 98 to contact.

As described above, heat from the newly deposited DMD layer 46 will alter the microstructure of the DMD affected zone of the existing metallic structure 50A. Particularly, the microstructure of DMD affected zone will be altered such that the DMD affected zone will no longer have substantially fully forged structural characteristics. Hence, the newly deposited DMD layer 46 and DMD affected zone will have non-forged structural qualities while the remaining portion, i.e., Zone C, of the existing metallic structure 50A will retain substantially fully forged structural qualities, as indicated at (c) of FIG. 4. Next, the friction stir device 18 is employed to friction stir the newly deposited DMD layer 46 and at least the DMD affected zone of the existing metallic structure 50A. More particularly, the newly deposited DMD layer 46 and at least the DMD affected zone of the existing metallic structure 50A are friction stirred utilizing a friction stir tool 94 having a selected tip 98 particularly structured to generate a friction stir zone that will encompass the newly deposited DMD layer 46 and at least the DMD affected zone of the existing metallic structure 50A.

Accordingly, the microstructure of the newly deposited DMD layer 46 and the DMD affected zone of the existing metallic structure 50A are refined and homogenized, i.e., recrystallized, such that the microstructures of the two DMD layers 46 are integrated, i.e., mixed and bonded, to form an aggregate structure having substantially fully forged structural characteristics, as indicated at (d) of FIG. 4. Therefore, the aggregate structure is a non-forged structure having substantially fully forged structural qualities.

As indicated at (e) of FIG. 4, the sequence of depositing new DMD layers 46 onto previously deposited and friction stirred DMD layers 46, i.e., existing metallic structures 50A, can be repeated to freeform a non-forged aggregate structure having substantially fully forged structural qualities.

Referring now to FIGS. 1B and 5, as described above, in various embodiments, the existing metallic layer 50 can comprise a preexisting forged metal structure, i.e., the existing metallic layer 50B. In such embodiments, the direct metal deposition and friction stir system 10 can be employed to repair a stress crack or fissure in the existing metallic structure 50B or to form an appending structure of any shape that is integrally formed with the existing metallic structure 50B. FIG. 5 exemplarily illustrates a fabricating sequence of depositing and friction stirring at least one DMD layer 46 to the existing metallic structure 50B to integrally from the friction stirred DMD layer(s) 46 with the existing metallic structure 50B, utilizing the direct metal deposition and friction stir system 10.

Initially, a DMD layer 46 is deposited onto the existing metallic structure 50B utilizing the DMD assembly 14. As described above, heat from newly deposited DMD layer 46 will alter the microstructure of the DMD affected zone of the existing metallic structure 50B. Particularly, the microstructure of DMD affected zone will be altered such that the DMD affected zone will it no longer have fully forged structural characteristics. Hence, the newly deposited DMD layer 46 and DMD affected zone will have non-forged structural qualities while the remaining portion, i.e., Zone C, of the existing metallic structure 50B will retain fully forged structural qualities, as indicated at (a) of FIG. 5.

Then, the deposited DMD layer 46 is friction stirred utilizing the friction stir device 18 having a tool tip 98 particularly structured to generate a stir zone that will have a depth D sufficient to friction stir the DMD layer 46 and at least the DMD affected zone. Accordingly, the microstructure of the DMD layer 46 and the DMD affected zone of the existing metallic structure 50B are refined and homogenized, i.e., recrystallized, such that the microstructures of the DMD layer 46 and existing metallic structure 50B are integrated, i.e., mixed and bonded, to form an aggregate structure, as indicated at (b) of FIG. 5. Therefore, the aggregate structure is a substantially non-forged structure having substantially fully forged structural qualities, as indicated a (b) of FIG. 5. Particularly, (b) of FIG. 5 illustrates how the direct metal deposition and friction stir system 10 can be employed to repair a stress crack or fissure in the existing metallic structure 50B.

However, if it is desired to form an appending structure that is integrally formed with the existing metallic structure 50B, a subsequent, or new, DMD layer 46 can be deposited on the recrystallized DMD layer, which now becomes the existing metallic structure 50A. As described above, in various embodiments, prior to friction stirring of the DMD layer 46, at top portion of the DMD layer 46 can be milled, via a milling system (not shown) included in the direct metal deposition and friction stir system 10 in order to provide a substantially flat top surface on the DMD layer 46 for the friction stir tool tip 98 to contact.

As described above, heat from newly deposited DMD layer will alter the microstructure of the DMD affected zone of the existing metallic structure 50A. Particularly, the microstructure of DMD affected zone will be altered such that the DMD affected zone will no longer have substantially fully forged structural characteristics. Hence, the newly deposited DMD layer 46 and DMD affected zone will have non-forged structural qualities while the remaining portion, i.e., Zone C, of the existing metallic structure 50A will retain substantially fully forged structural qualities, as indicated at (c) of FIG. 5. Next, the friction stir device 18 is employed to friction stir the newly deposited DMD layer 46 and at least the DMD affected zone of the existing metallic structure 50A. More particularly, the newly deposited DMD layer 46 and the DMD affected zone of the existing metallic structure 50A are friction stirred utilizing a friction stir tool 94 having a selected tip 98 particularly structured to friction stir the newly deposited DMD layer 46 and at least the DMD affected zone of the existing metallic structure 50A.

Accordingly, the microstructure of the newly deposited DMD layer 46 and the DMD affected zone of the existing metallic structure 50A are refined and homogenized, i.e., recrystallized, such that the microstructures of the two DMD layers 46 and the existing metallic structure 50B, i.e., the forged metal structure, are all integrated to form an aggregate structure having substantially fully forged structural qualities, as indicated at (d) of FIG. 5. Particularly, the aggregate structure is a substantially non-forged structure having substantially fully forged structural qualities.

As indicated at (e) of FIG. 5, the sequence of depositing new DMD layers 46 onto previously deposited and friction stirred DMD layers 46, i.e., existing metallic structures 50A, can be repeated to form an appending structure of any shape that is integrally formed with the existing metallic structure 50B.

As described above the friction stir tool 94 is selected to have a tip 98 that will generate a friction stir zone having a minimum depth D that, in various embodiments, encompasses the DMD layer 46 and at least the DMD affected zone of the existing metallic structure 50. It should be noted that direct metal deposition and friction stir system 10, as described herein, is structured and operable to generated a friction stir zone having a minimum depth D that can be 1 mm, 2 mm or more, based on the geometry of the friction stir tool tip 98.

Referring now to FIGS. 6-8, microhardness tests were performed on a DMD layer 46 of Ti-6Al-4V that had been deposited onto an existing metallic structure 50 and friction stirred utilizing the direct metal deposition and friction stir system 10, as described herein. Moreover, the microhardness test were performed for DMD layers 46 that were friction stirred with two different friction stir tools T1 and T2, each having a different tip 98 geometry.

Referring particularly to FIG. 6, the Ti-6Al-4V DMD layers 46 were deposited onto a forged metal structure, i.e., onto an existing metallic structures 50B. The microhardness test revealed that the hardness had increased noticeably in the friction stir zone for the DMD layers 46 stirred with each of the friction stir tools T1 and T2. As illustrated, lower RPM stirs made with friction stir tool T2 imparted more hardness to the stir zone than friction stir tool T1. Similar trends were observed when the microhardness data was compared on the advancing side and the retreating side of the friction stir tools T1 and T2. Also, it should be noted that the microhardness steadily decreased as a function of depth within the friction stir zone. This can be attributed to more plastic strain being imparted by the respective friction stir tool tip shoulder 106 at the top of the friction stir zone as compared to the remaining volume of the friction stir zone, there by inducing greater microhardness near the top of the friction stir zone.

Referring now to FIG. 7, the Ti-6Al-4V DMD layers 46 were deposited onto previously deposited and friction stirred Ti-6Al-4V DMD layer 46, i.e., onto an existing metallic structures 50A. As illustrated, the microhardness tests revealed that the hardness of the friction stir zone increased more noticeably for the run using friction stir tool T2 than for the run using friction stir tool T1. However, in both runs it was observed that hardness profiles in the microhardness for the regions of the existing metallic structures 50A beyond the friction stir zone, i.e., Zone C, closely followed each other indicating that the microhardness within Zone C remained uniform.

Referring now to FIG. 8, two layers of Ti-6Al-4V DMD layers 46 were deposited onto a previously deposited and friction stirred Ti-6Al-4V DMD layer 46, i.e., onto an existing metallic structures 50A. As illustrated, increased hardness was observed in the heat affected zone, i.e., Zone B, formed by the deposition of the DMD layer 46 onto the previously deposited and friction stirred DMD layer, i.e., onto existing metallic structures 50A. It was also noted that the deposit dilution zone, i.e., Zone A, was softer than the heat affected zone, i.e., Zone C, from subsequent laser deposition. Also, it was discovered that microhardness values decrease within the DMD affected zone as a function of depth.

Referring now to FIG. 9, in various embodiments, the control system 26 is a computer based system that generally includes at least one processor 130 suitable to execute all functions of the control system 26 to automatically, or robotically, control the operations of the direct metal deposition and friction stir system 10, as described herein. The control system 26 additionally includes at least one electronic storage device 134 that comprises a computer readable medium, such as a hard drive or any other electronic data storage device for storing such things as software packages or programs, algorithms and digital information, data, look-up tables, spreadsheets and databases. Furthermore, the control system 26 includes a display 142 for displaying such things as information, data and/or graphical representations, and at least one user interface device 146, such as a keyboard, mouse, stylus, and/or an interactive touch-screen on the display 142. In various embodiments the control system 26 can further include a removable media reader 150 for reading information and data from and/or writing information and data to removable electronic storage media such as floppy disks, compact disks, DVD disks, zip disks, flash drives or any other computer readable removable and portable electronic storage media. In various embodiments the removable media reader 150 can be an I/O port of the control system 26 utilized to read external or peripheral memory devices such as flash drives or external hard drives.

In various embodiments, the control system 26, i.e., the processor 130 can be communicatively connectable to a remote server network 154, e.g., a local area network (LAN), via a wired or wireless link. Accordingly, the control system 26 can communicate with the remote server network 154 to upload and/or download data, information, algorithms, software programs, CAD files and/or receive operational commands. Additionally, in various embodiments, the control system 26 can be structured and operable to access the Internet to upload and/or download data, information, algorithms, software programs, CAD files etc., to and from Internet sites and network servers.

In various embodiments, the control system 26 can include one or more system control algorithms, or programs 158, stored on the storage device 134 and executed by processor 130. In various embodiments, the one or more system control algorithms 158 are executed to interpret CAD files and control the operation of the DMD assembly 14, the friction stir device 18, the X-Y stage 22, and all other operation of the direct metal deposition and friction stir system 10, to deposit and friction stir the DMD layer 46 to fabricate substantially non-forged structures having substantially fully forged structural qualities, in accordance with the interpreted CAD files, as described herein.

Hence, as described above, the direct metal deposition and friction stir system 10, is structured and operable to fabricate substantially non-forged structures having substantially fully forged structural qualities. For example freeform parts fabricated using the direct metal deposition and friction stir system 10 will have microstructures that provided the part with substantially fully forged structural qualities, and repaired forged metal structures will have the same or better strength characteristics as the original structure. This can be advantageous for repairing parts that need to meet certain certification standards because the repaired part will meet or exceed the certification standards for the original part.

Moreover, operation of the direct metal deposition and friction stir system 10, as described herein refines and homogenizes the microstructure of the DMD layer 46 and the existing metallic structure 50 without substantially destroying the shape of the aggregate structure. That is, the recrystallization is induces without inducing an exterior shape change of the structure.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method for fabricating a direct metal deposition structure having substantially fully forged structural qualities, said method comprising:

depositing, via a direct metal deposition (DMD) assembly, a DMD layer of melted metallic material onto an existing metallic structure, the existing metallic structure having a microstructure that provides the existing metallic structure with substantially fully forged structural qualities of the respective metal of the existing metallic structure, the DMD layer having a microstructure that provides the DMD layer with non-forged structural qualities, the structural qualities including a durability, a hardness, a ductility, a tensile strength and a shear strength of the metal of the respective existing metallic structure and the DMD layer;

creating, via heat from the deposited melted DMD layer, a DMD affected zone within the existing metallic structure adjacent where the deposited DMD layer has been deposited, the DMD affected zone comprising a portion of the existing metallic structure in which the microstructure has been altered by the heat from the deposited melted DMD layer to have non-forged structural qualities of the metal of the existing metallic structure; and applying a friction stir process to the deposited DMD layer utilizing a friction stir device such that the deposited DMD layer and at least the DMD affected zone of the existing metallic structure are friction stirred to refine and homogenize the microstructure of the deposited DMD layer and at least the DMD affected zone of the existing metallic structure to produce a non-forged aggregate structure having a microstructure that provides the non-forged aggregate structure with substantially fully forged structural qualities of the respective metal of the existing metallic structure, the aggregate structure comprising the existing metallic structure, including the DMD affected zone and the deposited DMD layer.

2. The method of claim 1 wherein applying the friction stir process to the deposited DMD layer comprises applying the friction stir process to the deposited DMD layer utilizing a selected friction stir tool connectable to the friction stir device, the selected friction stir tool including a tip having a particular geometry and dimensions selected to provide a friction stir zone of a desired depth, width and shape that will include at least a portion of the deposited DMD layer and at least the DMD affected zone of the existing metallic structure.

3. The method of claim 1, wherein the existing metallic structure comprises a forged metal structure, and depositing the DMD layer onto an existing metallic structure comprises depositing the DMD layer onto the forged metal structure.

4. The method of claim 1, wherein the existing metallic structure comprises a DMD layer that has previously been friction stirred, and wherein depositing the DMD layer onto an existing metallic structure comprises depositing the DMD layer onto the previously friction stirred DMD layer.

5. A method for fabricating a direct metal deposition structure having substantially fully forged structural qualities, said method comprising:

depositing, via a direct metal deposition (DMD) assembly disposed within a processing cabinet of a direct metal deposition and friction stir system, a layer of melted metallic material onto an existing metallic structure, the existing metallic structure having a microstructure that provides the existing metallic structure with substantially fully forged structural qualities of the metal of the respective existing metallic structure, the DMD layer having a microstructure that provides the DMD layer with non-forged structural qualities, the structural qualities including a durability, a hardness, a ductility, a tensile strength and a shear strength of the metal of the respective existing metallic structure and the DMD layer;

creating, via heat from the deposited melted DMD layer, a DMD affected zone within the existing metallic structure adjacent where the deposited DMD layer has been deposited, the DMD affected zone comprising a portion of the existing metallic structure in which the microstructure has been altered by the heat from the deposited melted DMD layer to have non-forged structural qualities of the metal of the existing metallic structure;

selecting a friction stir tool connectable to a friction stir device disposed within the processing cabinet of the direct metal deposition and friction stir system to have a tip having a selected geometry and dimensions structured to provide a friction stir zone of a selected depth, width and shape that will encompass at least a portion of the deposited DMD layer and at least the DMD affected zone of the existing metallic structure when used to friction stir the deposited DMD layer; and friction stirring the deposited DMD layer utilizing the selected friction stir tool to refine and homogenize the microstructure of the deposited DMD layer and at least the DMD affected zone of the existing metallic structure encompassed within the friction stir zone to produce a non-forged aggregate structure having a microstructure that provides the non-forged aggregate structure with substantially fully forged structural qualities of the metal of the existing metallic structure, the aggregate structure comprising the existing metallic structure, including the DMD affected zone and the deposited DMD layer.

6. The method of claim 5, wherein the existing metallic structure comprises a forged metal structure, and depositing the DMD layer onto an existing metallic structure comprises depositing the DMD layer onto the forged metal structure.

7. The method of claim 5, wherein the existing metallic structure comprises a DMD layer that has previously been friction stirred, and wherein depositing the DMD layer onto an existing metallic structure comprises depositing the DMD layer onto the previously friction stirred DMD layer.

8. The method of claim 5 further comprising, prior to friction stirring the deposited DMD layer, milling a top of the deposited DMD layer to provide a flat top surface on the DMD layer.

* * * * *

UNITED STATES PATENT AND TRADEMARK OFFICE
CERTIFICATE OF CORRECTION

PATENT NO. : 8,617,661 B2  
APPLICATION NO. : 12/787075  
DATED : December 31, 2013  
INVENTOR(S) : Joseph William Newkirk, Fuewen Frank Liou and Romy Francis It is certified that error appears in the above-identified patent and that said Letters Patent is hereby corrected as shown below:

In the Specification

In Column 7, line 5, after "Referring now to FIGS. 1 and 10" replace "10" with --1C--.

Signed and Sealed this  
Nineteenth Day of August, 2014

Michelle K. Lee  
*Deputy Director of the United States Patent and Trademark Office*